June 30, 1925.  1,543,927
O. KERSTEN
CUT-OUT ASSEMBLY
Filed Oct. 14, 1921
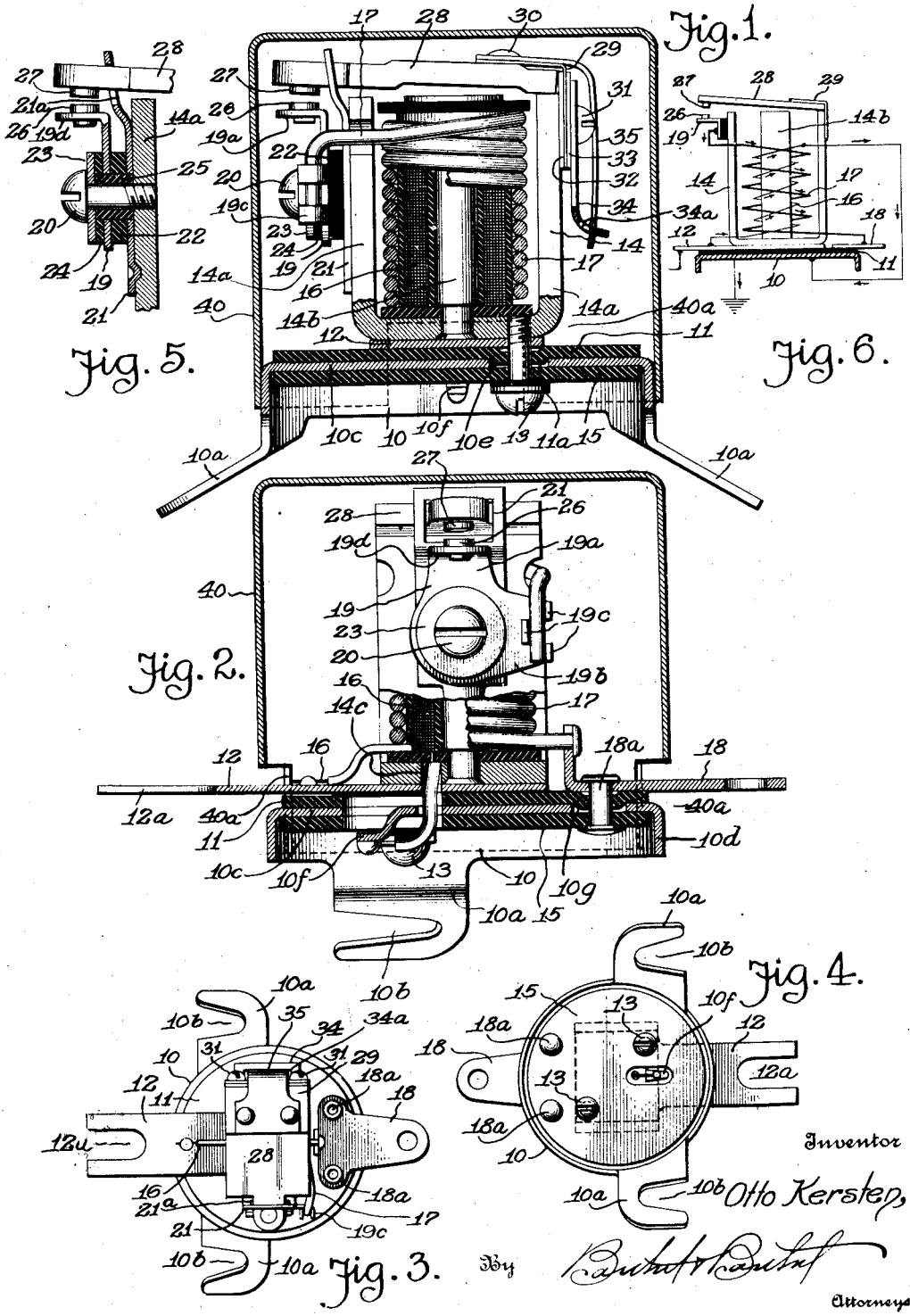

Patented June 30, 1925.

1,543,927

UNITED STATES PATENT OFFICE.

OTTO KERSTEN, OF HIGHLAND PARK, MICHIGAN.

CUT-OUT ASSEMBLY.

Application filed October 14, 1921. Serial No. 507,782.

*To all whom it may concern:*

Be it known that I, OTTO KERSTEN, a citizen of the United States of America, residing at Highland Park, in the county of Wayne and State of Michigan, have invented certain new and useful Improvements in Cut-Out Assemblies, of which the following is a specification, reference being had therein to the accompanying drawings.

This invention relates to improvements in cut-outs for battery charging systems and pertains more particularly to cut-outs adapted to be used in connection with motor vehicle service, although adapted for use in other relations.

While the invention is adapted for general use, it is particularly adapted for meeting the conditions presented in motor vehicle service, wherein the battery is charged by a generator driven from the internal combustion engine. Installations of this type are confronted with the inherent feature that the speed of the generator is variable, by reason of the fact that the engine is itself operated under variable speed conditions, the speed variations ranging from zero to a maximum speed of possibly 2000 R. P. M. or even greater. Since the battery unit in such installations is limited as to size, etc., it becomes necessary that some apparatus—which may be considered as having characteristics of an automatic valve—be interposed between the generator and the battery in order that the battery may not become impaired by reason of the speed variation conditions brought about by operative connection of the generator and the battery.

Various ways of meeting this difficulty have heretofore been employed, these generally being in the form of a cut-out which is operative to make or complete the circuit to the battery only when the generator is operating above a predetermined speed, the cut-out, also in some cases, being arranged to automatically break this circuit when the battery conditions are such as to set up a superior voltage value in the circuit to the value set up by the generator.

It is to this latter type of controlling means that the present invention more particularly pertains, the general object of the invention being to provide a construction of this type and for this purpose which is simple and efficient in operation, durable in construction, readily installed, capable of adjustment prior to completion and incapable of adjustment after completion to prevent tampering, and which can be readily manufactured under production capacity conditions and at a comparatively low cost of manufacture.

To these and other ends, the nature of which will be readily understood as the invention is hereinafter disclosed, said invention consists in the improved construction and combination of parts hereinafter more fully described, illustrated in the accompanying drawings and more particularly set forth in the appended claims.

In the accompanying drawings, in which similar reference characters indicate similar parts in each of the views, Figure 1 is a view partly in side elevation and partly in section of a cut-out unit forming one embodiment of the present invention;

Fig. 2 is a view partly in end elevation and partly in section of the construction shown in Fig. 1;

Fig. 3 is a top plan view of the construction shown in Fig. 1;

Fig. 4 is a bottom plan view of said construction;

Fig. 5 is a detail view partly in elevation and partly in section;

Fig. 6 is a diagrammatic view showing the arrangement of the windings, etc.

For the purpose of illustrating the present invention, I have shown it as having certain characteristics which make it applicable for use in connection with the battery charging system of the Ford car, the latter system including a generator having a drive connection with the engine, the generator being connected up to the battery by a suitable circuit in which the cut-out is positioned. For economy of space etc., the unit is preferably secured to the casing of the generator, the unit having a sheet metal member 10 which is adapted to be readily positioned on to the upper outer surface of the generator casing in suitable manner, the drawings showing the use of ears 10ª carrying slots or recesses 10ᵇ adapted to engage suitable structures on the generator casing, not shown.

Member 10 carries a generally plane face 10ᶜ—which may be of any suitable configuration but shown as generally circular—and on this is mounted the remainder of the unit; obviously, this surface may be varied from a plane surface, and may have various configurations, the particular form shown being readily produced and having been found, in practice, to produce satisfactory results. Member 10 as shown, is preferably formed with a downwardly projecting flange portion 10$^d$. The portions 10$^c$ and 10$^d$ have the characteristics of an inverted cup, face 10$^c$ forming the bottom of the cup, the interior of the cup providing a space for the reception of certain elements presently referred to.

On the upper or outer side of the face 10$^c$ and insulated therefrom by an insulating member 11 is a terminal member 12, shown as in the form of a flat plate provided with a recess 12$^a$ which extends inwardly from the outer end of the member this recess being adapted to receive the binding post formation which connects the terminal electrically with the generator, this formation not being shown, but it is obvious that it may be an upstanding post on the casing of the generator and arranged in such manner that when the unit is positioned on the casing of the generator by the use of recesses 10$^b$, member 12 will also be moved relative to the binding post so as to locate the proper portions of the latter within the recess 12$^a$.

Terminal 12 is secured in proper relation to cup member 10 by being located between the insulating member 11—preferably a disk of sheet material—and the U-shape portion 14$^a$ of the magnet 14, the latter being secured in proper position by screws 13. The assembly includes an insulating member 15 inside of the cup, the heads of the screws 13 being located below insulating member 15— and thus within the cup,—the body portion or shank of the screw passing through an enlarged opening 10$^e$ in face 10$^c$, through an opening in terminal 12, and then threaded into portion 14$^a$, terminal 12 and portion 14$^a$ being in metallic contact, each screw being insulated from face 10$^c$ by reason of the size of the opening 10$^e$ and the presence of a portion 11$^a$ of insulating member 11, said portion extending within opening 10$^e$ and tending to prevent shifting of the screw relative to face 10$^c$. Since insulating members 11 and 15 may be in the form of a sheet of prepared insulating paper, etc., portions 11$^a$ may be produced by simply depressing the proper portions of the member so as to project into the opening 10$^e$, the depression being formed at the time member 11 is stamped out. As presently described, an additional portion of member 11 has a generally similar formation, and it will be understood that these depressed portions will aid in the rapid assembly of the elements of the unit since these portions will serve as means to rapidly locate the insulating member 11 in proper position relative to face 10$^c$, thus positioning these parts in proper relation with each other to provide for the proper alinement to meet the assembling conditions.

Portion 14 of the magnet formation carries the usual soft iron core 14$^b$, on which is mounted the fine wire winding 16 and the coarse wire winding 17, these windings being of the proper number of turns, and preferably wound in the general and relative directions indicated in Fig. 6, the spool formation which includes the windings being such as to provide for the proper location of the windings relative to the core and to the remainder of the magnet, it being preferred that the upper or outer ends of portion 14$^a$ and the outer limits of the winding spool and the core 14$^b$ be on substantially the same plane, a result that can be obtained by first assembling portion 14$^a$, its core 14$^b$ and the spool, and then placing the outer or upper ends of these parts on to a flat abrading surface so that this condition will be obtained.

One end of the fine wire winding is secured to terminal 12, as by soldering, thus connecting the fine wire winding directly to the circuit leading from the generator, the other end of said fine wire winding being led out through an opening 14$^c$ in the bridge section of portion 14$^a$, through an opening in terminal 12 and an opening in member 10, the end of the winding being secured in suitable manner, as by soldering, to the underside of face 10$^c$, the latter preferably having a struck-up finger 10$^f$, which projects downwardly in the assembly below the plane of member 15, thus locating the point of connection of this end of the fine wire winding relative to terminal 12 as to practically eliminate any possibility of short circuiting the fine wire circuit between such free end and terminal 12. Member 10 serves to "ground" this winding.

The coarse wire winding 17, which is preferably wound upon the fine wire winding, has one end secured to a member or terminal 18 positioned on the insulating member 11, the cup bottom or face 10$^c$ having an opening 10$^g$ for the passage of rivets or studs 18$^a$ which secure the terminal in position. As shown in Fig. 2 the insulating member 11 is provided with depressed portions similar to and for the same purpose as the depressed portions used in connection with screws 13. The end of the coarse wire is secured to the bracket in any suitable manner as by soldering.

The opposite end of the coarse wire winding 17 is secured to a terminal member 19 mounted on one of the legs of the portion 14$^a$, terminal 19 forming a part of an assembly held in place by a screw 20 which threads into such leg. This assembly includes terminal 19 spaced from a member 21, presently described, by an insulating collar 22, a washer 23 spaced from terminal member 19 by an insulating washer 24, the screw 20 and a bushing 25 mounted on the stem of the screw and which serves to insulate the terminal 19 from the screw; bushing 25 is also shown as spacing member 21 from the screw, but this may be varied.

As shown in Fig. 2, terminal 19 is preferably of sheet metal characteristic, being shown as having two arms 19$^a$ and 19$^b$, arm 19$^b$ carrying struck-up fingers 19$^c$ adapted to form a guide to receive the end of the coarse wire winding, the latter then being secured in such position in suitable manner, a simple method being by the use of solder. Arm 19$^a$ carries a laterally projecting portion 19$^d$ to which is secured a contact 26 of suitable material, this contact being adapted to cooperate with a contact 27 carried by the armature 28 of the magnet.

Armature 28 is shown as having a hinge connection with the opposite leg of portion 14$^a$ of the magnet, the hinge being of sheet metal and shown at 29, the sheet metal strip being bent at substantially right angles, one end being attached to the armature by rivets 30, the opposite end being secured in position relative to the leg by screws 31, a suitable metallic spacing member 32 being interposed between the leg and this portion of the hinge, while a similar member 33 is interposed between such hinge portion and a member 34, which acts as a supporting member for one end of a leaf spring 35 forming the tension member for the armature. As will be seen spacing member 32 extends above the end of the leg portion 14$^a$, as does member 33, the result being that the hinge 29, which may be of bendable material, is rigidly supported below approximately the upper plane of the armature, the point where it is desired that the hinging action should take place.

Spring 35 is shown as riveted to the armature by rivets 30, and is formed more or less L-shaped, the free end extending downward in overlying relation to the hinge and passing through an opening 34$^a$ formed in a laterally extending portion of member 34, member 34 thus becoming a member adapted to control the tension of spring 35.

This general form just described is of advantage, in that it is possible to adjustably regulate the tension of spring 35 by the position of the free end of member 34. This result can be obtained by bending the portion of member 34 below the screws 31 outwardly or inwardly as may be found necessary, the outward binding being obtained by placing some implement, as a screw driver, between this portion of member 34 and the leg and applying pressure to give a slight outward bend to member 34—thus reducing the tension of spring 35—or, by tapping the end of the laterally extending portion of member 34 with a hammer, the member 34 can be bent slightly inward, thus increasing the tension of spring 35. Member 34 preferably terminates at a point materially above the plane of member 11.

Member 21, which is provided with an opening 21$^a$ serves as a keeper to limit the outward movement of the armature, the free end of the latter having a portion which projects through opening 21$^a$. Member 21 is formed of bendable sheet metal, and is so arranged as to permit of slight adjustment of the length of movement of the free end of the armature. This adjustment is provided by bending the upper end of member 21 to shift the part above the armature toward or away from the hinge line, the upper end of the member 21 being arranged free to permit this action to take place. For instance, it will be understood from an inspection of Fig. 5, that if the upper end of member 21 be bent so as to shift it toward the right in said figure, the free end of the armature can rise an increased distance, since the upper wall of opening 21$^a$ is then in a position which will permit the armature to move outwardly to a greater extent; if this upper portion be shifted to the left on Fig. 5, the shift will act to decrease the distance between the contacts 26 and 27. Obviously such adjustment of member 21 controls the position of the armature relative to the outer end of the core 14$^b$, and hence the adjustment determines to a more or less degree, the value of current required to produce the armature movement.

In order to prevent sticking of the armature in presence of the fact that the legs and core of the magnet field are on the same plane, I prefer to provide for keeping the armature out of contact with the core by setting up a spaced relation therebetween, this being done in a simple way by simply subjecting the armature to an off-setting action as by the use of a die, thus setting up a formation such as shown, for instance, in Fig. 1.

Terminal 18 is connected up with the battery, the battery line having, if desired, suitable instrumentalities therein to measure the characteristics of the current, etc., it being readily understood that this places the coarse wire winding as part of the charging circuit, this circuit being broken at contacts 26 and 27 whenever the armature is in its upper or raised position. When the engine is in operation, thus rendering the generator active, the latter, through its connection with terminal 12, renders the fine wire winding active, thus setting up conditions to energize the magnet. Whenever the value of the current in the fine wire winding becomes sufficient to cause armature 28 to move against the tension of spring 35 sufficient to bring contacts 26 and 27 into engagement, a circuit between terminal 12 and terminal 18 will be established through the coarse wire winding, this circuit extending through portion 14ª, hinge 29, the armature 28, contacts 26 and 27, terminal 19, and the coarse wire winding to terminal 18, thus producing a closed circuit between the generator and the battery and permitting charging action to take place. The direction of winding of the two windings 16 and 17 is such that when this circuit is thus closed and where the battery condition is such that current will flow from the generator to the battery, the activity of winding 17 will augment the action of winding 16 with respect to core 14ᵇ, and thus retain armature 28 in its position to maintain this circuit through winding 17 closed.

When, however, the battery condition is changed so as to make the battery voltage value dominant with respect to the generator value, current flow will reverse through winding 17, thus setting up conditions tending to neutralization in the magnet with the result that the tension of spring 35 becomes dominant and shifts the armature to its outer position, thus breaking the circuit to the battery between contacts 26 and 27.

As will be understood this general arrangement acts to prevent closing of the charging circuit until the engine has reached a predetermined speed of rotation, and that whenever the battery voltage value exceeds that being set up by the generator, the circuit will be automatically broken; in this respect, the structure has the characteristics of other cut-outs designed for this use.

As will be seen the arrangement and construction of parts for producing this result is such as to especially provide for production under high capacity conditions, the parts being of such form as to be readily produced by stamping out and dieing operations, the relative location of parts and their forms being such as to provide for assemblage without requiring the use of highly skilled labor, and with the conditions of compactness, etc., obtained. In addition, the arrangement is such as to permit of ready adjustment so as to provide for efficient operation.

In practice, after assembly of the unit, the unit is tested as to its qualities for closing the battery circuit at predetermined speeds of the generator, and if necessary adjustment provided, either by adjusting the tension of the spring 35 or by adjusting the throw of the armature at member 21, or both, the testing being designed to meet an approximate standard. A cupped cover 40 is then positioned over the magnet formation, the cup extending over the flanged portion of member 10, the cupped member being permanently secured in position, in suitable manner, as for instance by spot welding, this method of securing the cover in position preventing removal of the cover. The cover is provided with recessed portions or openings 40ª through which the terminals 12 and 18 extend, the openings being of a size as to prevent conditions of short circuiting.

When the cover is in position, possibility of tampering with magnet formation in a way to disturb the adjustmnet is obviously prevented, due to the fact that the points of adjustment are so located and are of such characteristics as to practically prevent the use of tools to disturb the adjustment, the adjustment of member 21 being at the opposite end of the assembly, and the adjustment of member 34 being required at a point intermediate the ends of the magnet formation presenting conditions which practically prevent the use of any tool for the purpose. Hence while the adjustment can be readily had at the time of production of the unit, these adjustments become actually concealed by the positioning of the cover, so that when the unit is installed further ability to adjust is lost.

While I have herein shown and described a preferred embodiment of the invention, it will be readily understood that changes and modifications therein may be found desirable or necessary in meeting the various exigencies of use, and I desire to be understood as reserving the right to make any and all such changes and modifications as may be found desirable or essential in so far as the same may fall within the spirit and scope of the invention as set forth in the accompanying claims when broadly construed.

What I claim is:—

1. In cut-outs for battery charging systems, a magnet formation including a core-carrying member of U-shaped configuration and a pair of windings of fine and coarse wire characteristic and having a hinged armature movable to make and break the circuit through the coarse wire winding, and a support for said formation, said support comprising a cup-shaped sheet metal member having means to permit mounting upon a generator casing, an insulating member of sheet form positioned on the outer side of the bottom of the cup, a sheet metal terminal positioned on said insulating member and in underlying relation to and in contact with said core-carrying member, said terminal having a connection with one end of the fine wire winding, and means for securing said cup member, insulating member, terminal and core-carrying member into a unitary formation, said means including a screw having its head within the cup and its shank passed through the cup, the insulating member and terminal and threaded to the core-carrying member, said screw being insulated from the cup-member.

2. In cut-outs for battery-charging systems, a magnet formation including a core-carrying member of U-shape configuration and a pair of windings of fine and coarse wire characteristic and having a hinged armature movable to make and break the circuit through the coarse wire winding, and a support comprising a cupshaped sheet metal member having means to permit mounting upon the generator casing, an insulating member of sheet form positioned on the outer side of the bottom of the cup, a sheet metal terminal positioned on said insulating member and in underlying relation to and in contact with said core-carrying member, said terminal having a connection with one end of the fine wire winding, and means for securing said cup member, insulating member, terminal and core-carrying member into a unitary formation, said means including a screw having its head within the cup and its shank passed through the cup, the insulating member and terminal and threaded to the core-carrying member, said screw being insulated from the cup-member, the opposite end of the fine wire winding being secured to said cup-member to produce a ground relation for the winding.

3. A cut-out as in claim 1, characterized in that the cup-member is formed with an enlarged opening for the passage of the screw, the insulating member having a depressed portion extending into said opening.

4. A cut-out as in claim 1, characterized in that the terminal extends outwardly beyond the cup flange and is formed to engage a line terminal outside of the cup.

5. In cut-outs for battery charging systems, a magnet formation including a core-carrying member of U-shape configuration and a pair of windings of fine and coarse wire characteristic and having a hinged armature movable to make and break the circuit through the coarse wire winding, and a support for said formation, said support comprising a cup-shaped sheet metal member having means to permit mounting upon a generator casing, an insulating member of sheet form positioned on each side of the bottom of the cup, a sheet metal terminal positioned on the insulating member located on the outer side of the bottom of the cup and in underlying relation to and in contact with said core-carrying member, said terminal having a connection with one end of the fine wire winding, and means for securing said cup member, insulating members, terminal and core-carrying member into a unitary formation, said means including a screw having its head within the cup and overlying the inner insulating member and having its shank passed through the cup member, the insulating members and terminal and threaded to the core-carrying member, said screw being insulated from the cup member.

6. In cut-outs for battery charging systems, a magnet formation including a core-carrying member of U-shape configuration and a pair of windings of fine and coarse wire characteristic and having a hinged armature movable to make and break the circuit through the coarse wire winding, and a support for said formation, said support comprising a cup-shaped sheet metal member having means to permit mounting upon a generator casing, an insulating member of sheet form positioned on the outer side of the bottom of the cup, a sheet metal terminal positioned on said insulating member and in underlying relation to and in contact with said core-carrying member, said terminal having a connection with one end of the fine wire winding and, means for securing said cup member, insulating member, terminal and core-carrying member into a unitary formation, said means including a screw having its head within the cup and its shank passed through the cup, the insulating member and terminal and threaded to the core-carrying member, said screw being insulated from the cup-member, a second sheet metal terminal positioned on said insulating member, and means extending through said insulating member and said cup-member for securing such second terminal in position, said latter means being insulated from the cup-member, such second terminal being adapted to connect the coarse wire winding with the battery line lead.

7. A cut-out as in claim 6, characterized in that each terminal is positioned to extend outwardly beyond the cup flange, the direction of extension being substantially transverse to the direction of length of the core-carrying member, the projecting portions of the terminal being on opposite sides of the cup.

8. A cut-out as in claim 2, characterized in that the cup and insulating members are provided with openings for the passage of the fine wire winding "ground" end, the cup-member having an off set portion extending into the cup to which such end is secured.

9. In a cut-out assembly, a magnet formation, and a support therefor, said formation and support being insulated from each other and secured together, said magnet formation including a core-carrying member of approximately U-shape contour with the core extending parallel to the legs of and secured to the bridge of the member, the free ends of the legs and the core extending in the same plane, independent fine and coarse wire windings carried by the core member, said core-carrying member being active as a current carrier with the activity limited to periods of activity of the coarse wire windings, an armature of bar form hinged at the end of one of the legs and adapted to overlie said core end and the end of the other leg, said armature being off-set opposite the core and to provide a permanently spaced relation with the armature end of the magnet to prevent sticking of the armature in service, and a tension element operative on said armature and extending over the hinge connection of the latter.

10. In a cut-out assembly, a magnet formation, and a support therefor, said formation and support being insulated from each other and secured together, said magnet formation including a core-carrying member of approximately U-shape contour with the core extending parallel to the legs of and secured to the bridge of the member, a contact support carried by one of the legs of the core-carrying member, an armature carrying a contact, and means for hingedly connecting the opposite end of the armature to the opposite leg of the core-carrying member, said means including a sheet metal bendable member of L-shape adapted to constitute a hinge and having one end secured to the outer face of the armature and its other end to the leg with the latter end overlying the end of the armature, a sheet-metal support between the hinge member and the leg, said support overlying the armature end, a sheet metal support overlying the opposite side of the hinge member, and means for securing the hinge member assembly to the core-member leg.

11. In a cut-out assembly, a magnet formation, and a support therefor, said formation and support being insulated from each other and secured together, said magnet formation including a core-carrying member of approximately U-shape contour with the core extending parallel to the legs of and secured to the bridge of the member, a contact support carried by one of the legs of the core-carrying member, an armature carrying a contact, a hinge assembly connecting the opposite end of the armature to the opposite legs of the core-carrying member, and tensioning means for said armature, said means including a leaf spring of approximately L-shape and having one end permanently secured to and carried by the armature, said spring extending over and being of greater length than the hinge assembly, and a member positioned to receive the free end of the spring.

12. In a cut-out assembly, a magnet formation, and a support therefor, said formation and support being insulated from each other and secured together, said magnet formation including a core-carrying member of approximately U-shape contour with the core extending parallel to the legs of and secured to the bridge of the member, a contact support carried by one of the legs of the core-carrying member, an armature carrying a contact, a hinge assembly connecting the opposite end of the armature to the opposite legs of the core-carrying member, and tensioning means for said armature, said means including a leaf spring of approximate L-shape and having one end permanently secured to and carried by the armature, said spring extending over and being of greater length than the hinge assembly, and a member positioned to receive the free end of the spring, said latter member having the characteristic of being bendable under pressure values exceeding that of the spring to permit variation in position of the spring end to vary the tension of the spring.

13. In a cut-out assembly, a magnet formation, and a support therefor, said formation and support being insulated from each other and secured together, said magnet formation including a core-carrying member of approximately U-shaped contour with the core extending parallel to the legs of and secured to the bridge of the member, a contact support carried by one of the legs of the core-carrying member, an armature carrying a contact, a hinge assembly connecting the opposite end of the armature to the opposite legs of the core-carrying member, and tensioning means for said armature, said means including a leaf spring of approximate L-shape and having one end secured to the armature, said spring extending over and being of greater length than the hinge assembly, and a member positioned to receive the free end of the spring, said latter member overlying and being secured to the hinge assembly and having a length to locate the spring-receiving end on a plane intersecting an intermediate portion of the length of a leg of the core-carrying member.

14. In a cut-out assembly, a magnet formation, and a support therefor, said formation and support being insulated from each other and secured together, said magnet formation including a core-carrying member of approximately U-shape, contour with the core extending parallel to the legs of and secured to the bridge of the member, an armature hingedly connected to one of the legs of the core-carrying member, said armature carrying a contact beyond the opposite leg of such member, a contact support assembly carried by the latter leg of the core-carrying member, said assembly including a sheet metal element carrying a contact adapted to cooperate with the armature contact and having a configuration to receive an end of a magnet winding, means for maintaining said element in insulated relation to the core-carrying member, an armature movement limiting element positioned intermediate the core-carrying member and the sheet metal element and insulated from the latter, said limiting element being operative on the armature within a zone between the armature contact and the plane of the outer face of the adjacent core-carrying member leg, and tensioning means for said armature.

15. In a cut-out assembly, a magnet formation, and a support therefor, said formation and support being insulated from each other and secured together, said magnet formation including a core-carrying member of approximately U-shape contour with the core extending parallel to the legs of and secured to the bridge of the member, an armature hingedly connected to one of the legs of the core-carrying member, said armature carrying a contact beyond the opposite leg of such member, a contact support assembly carried by the latter leg of the core-carrying member, said assembly including a sheet metal element carrying a contact adapted to cooperate with the armature contact, and having a configuration to receive an end of a magnet winding, means for maintaining said element in insulated relation to the core-carrying member, an armature movement limiting element positioned intermediate the core-carrying member and the sheet-metal element and insulated from the latter, said limiting element being operative on the armature within a zone between the armature contact and the plane of the outer face of the adjacent core-carrying member leg and held to position by said assembly, and tensioning means for said armature.

16. In a cut-out assembly, a magnet formation and a support therefor, said formation and support being insulated from each other and secured together, said magnet formation including a core-carrying member of approximately U-shape contour with the core extending parallel to the legs of and secured to the bridge of the member, an armature hingedly connected to one of the legs of the core-carrying member, said armature carrying a contact beyond the opposite leg of such member, a contact support assembly carried by the latter leg of the core-carrying member, said assembly including a sheet metal element carrying a contact adapted to cooperate with the armature contact, means for maintaining said element in insulated relation to the core-carrying member, a sheet metal member held to position by the assembly with the shank of the latter member extending parallel to the core-carrying member leg to which the assembly is secured and between such leg and said sheet-metal contact-carrying element, said sheet metal member being formed to overlie the contact-carrying end of the armature inside the contact, to limit the armature movement in one direction.

17. In a cut-out assembly, a magnet formation and a support therefor, said formation and support being insulated from each other and secured together, said magnet formation including a core-carrying member of approximately U-shape contour with the core extending parallel to the legs of and secured to the bridge of the member, an armature hingedly connected to one of the legs of the core-carrying member, said armature carrying a contact beyond the opposite leg of such member, a contact support assembly carried by the latter leg of the core-carrying member, said assembly including a sheet metal element carrying a contact adapted to cooperate with the armature contact, means for maintaining said element in insulated relation to the core-carrying member, a sheet metal member held in position by the assembly with the shank of the latter member extending parallel to the core-carrying member leg to which the assembly is secured, said sheet metal member being formed to overlie the contact-carrying end of the armature inside the contact, to limit the armature movement in one direction, said sheet metal member being of a material of bendable characteristic, and having its armature contacting portion free to permit shift in the direction of armature length by bending to adjust the length of movement of the armature.

18. In cut-out structures for automatically controlling the making and breaking of circuits, a magnet formation including a hinged armature carrying a contact operative in the circuit being controlled, a tensioning instrumentality operative with and in opposition to the magnetic circuits to control the time of movement of the armature to close the controlled circuit, said instrumentality including an element adjustable to vary the tension value of the instrumentality, a support assembly for the magnet formation, said assembly carrying a terminal extending between itself and the magnet formation and projecting beyond the support, and a cupped cover member permanently secured to the assembly and enclosing the magnet formation and having an opening for the passage of the terminal, said instrumentality adjustable element being positioned relative to the opening to prevent adjustment manipulation of the element through the opening when the cover is in position.

19. In cut-out structures for automatically controlling the making and breaking of circuits, a magnet formation including a hinged armature carrying a contact operative in the circuit being controlled, a tensioning instrumentality operative with and in opposition to the magnetic circuit to control the time of movement of the armature to close the controlled circuit, an element operative to limit the length of movement of the armature, said element being adjustable to vary such armature movement length, a support assembly for the magnet formation, said assembly carrying a terminal extending between itself and the magnet formation and projecting beyond the support, and a cupped cover member permanently secured to the assembly and enclosing the magnet formation and having an opening for the passage of the terminal, said adjustable element being positioned relative to the opening to prevent adjustment manipulation of the element through the opening when the cover is in position.

20. In cut-out structures for automatically controlling the making and breaking of circuits, a magnet formation including a hinged armature carrying a contact operative in the circuit being controlled, a tensioning instrumentality operative with and in opposition to the magnetic circuit to control the time of movement of the armature to close the controlled circuit, said instrumentality including an element adjustable to vary the tension value of the instrumentality, an element operative to limit the length of movement of the armature, said element being adjustable to vary such armature movement length, a support assembly for the magnet formation, said assembly carrying a pair of terminals insulated from each other and each projecting beyond the support, said terminals extending on substantially the same plane, and a cupped cover member permanently secured to the assembly and enclosing the magnet formation and having individual openings for the passage of the terminals, said adjustable elements being positioned relative to the openings to prevent adjustment manipulation of such elements through the openings when the cover is in position.

21. In cut-out structures for automatically controlling the making and breaking of circuits, a magnet formation including a hinged armature carrying a contact operative in the circuit being controlled, a tensioning instrumentality operative with and in opposition to the magnetic circuit to control the time of movement of the armature to close the controlled circuit, said instrumentality including an element adjustable to vary the tension value of the instrumentality, an element operative to limit the length of movement of the armature, said element being adjustable to vary such armature movement length, said adjustable elements being located at opposite sides of the magnet formation, a support assembly for the magnet formation, said assembly carrying a pair of terminals insulated from each other and each projecting beyond the support, and a cupped cover member permanently secured to the assembly and enclosing the magnet formation and having individual openings for the passage of the terminals, said adjustable elements being positioned relative to the openings to prevent adjustment manipulation of such elements through the openings when the cover is in position.

In testimony whereof I affix my signature in presence of two witnesses.

OTTO KERSTEN.

Witnesses:
HORACE G. SEITZ,
ARTHUR MINNICK.